(12) United States Patent
Billger et al.

(10) Patent No.: US 7,059,680 B2
(45) Date of Patent: Jun. 13, 2006

(54) SEAT REPOSITIONING DEVICE WITH RELEASE ON CONTROL HANDLE

(75) Inventors: Steven C. Billger, Celina, OH (US); Kevin A. Gilliland, Coldwater, OH (US); Eric J. Kaiser, Ft. Recovery, OH (US); Leroy M. Kluver, Celina, OH (US); Jay G. Pollack, Sidney, OH (US); Steven R. Pulskamp, New Bremen, OH (US); Nicholas D. Thobe, Chickasaw, OH (US); Dean E. Winner, Celina, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 10/948,495

(22) Filed: Sep. 23, 2004

(65) Prior Publication Data

US 2006/0061178 A1    Mar. 23, 2006

(51) Int. Cl.
    *A47C 1/00*    (2006.01)
(52) U.S. Cl. .................. 297/344.22; 297/344.21; 297/344.23; 297/217.2; 297/217.3
(58) Field of Classification Search .......... 297/344.23, 297/344.22, 344.24, 344.21, 217.2, 217.3, 297/330, 344.17, 362.11
    See application file for complete search history.

(56) References Cited

U.S. PATENT DOCUMENTS

| | | | |
|---|---|---|---|
| 629,036 | A | 7/1899 | Koenigkramer |
| 1,242,110 | A | 10/1917 | Koken |
| 1,275,624 | A | 8/1918 | Sopwith |
| 1,361,987 | A | 12/1920 | Hamilton |
| 1,808,659 | A | 6/1931 | Hultgren |
| 2,603,303 | A | 7/1952 | Atlung |
| 2,833,367 | A | 5/1958 | Pool |
| 2,845,990 | A | 8/1958 | Hubert |
| 3,013,837 | A | 12/1961 | Pessl |
| 3,066,979 | A | 12/1962 | Pitts |
| 3,182,605 | A | 5/1965 | Brasher |
| 3,195,913 | A | 7/1965 | Hallsworth |
| 3,223,193 | A | 12/1965 | Reynolds |
| 3,254,900 | A | 6/1966 | Allen |
| 3,300,172 | A | 1/1967 | Noller |
| 3,412,968 | A | 11/1968 | Rose |
| 3,437,373 | A | 4/1969 | Boston |

(Continued)

FOREIGN PATENT DOCUMENTS

DE    25 44 812 A1    4/1977

(Continued)

OTHER PUBLICATIONS

Crown Turret Stockpicker, Series TSP SF 4310, Rev. Mar. 2002.

(Continued)

*Primary Examiner*—Rodney B. White
(74) *Attorney, Agent, or Firm*—Stevens & Showalter LLP

(57) ABSTRACT

Seat repositioning systems for vehicles comprise a seat release element that is operable to cause an operator's seat to be temporarily released from a locked position such that the operator's seat may be adjusted to a new position. By optionally positioning the seat release element proximate to an operator's working position, a vehicle operator may reposition the seat while simultaneously performing another task. Moreover, a control module may be provided that is capable of deciding whether or not to allow the operator's seat to be released based upon vehicle parameters such as vehicle speed or load handling conditions. Still further, the control module may temporarily disable select features of the vehicle depending upon the position of the seat.

32 Claims, 11 Drawing Sheets

U.S. PATENT DOCUMENTS

| | | | |
|---|---|---|---|
| 3,515,432 A | 6/1970 | Sporman | |
| 3,659,895 A | 5/1972 | Dresden | |
| 3,690,697 A | 9/1972 | Bohanski | |
| 3,693,744 A | 9/1972 | Horn | |
| 3,727,873 A | 4/1973 | Hill | |
| 3,747,723 A | 7/1973 | Peterson | |
| 3,893,728 A | 7/1975 | Holopainen | |
| 3,926,396 A | 12/1975 | Hall | |
| 3,933,224 A | 1/1976 | Nilsson | |
| 4,005,845 A | 2/1977 | Luppi | |
| 4,008,500 A * | 2/1977 | Hall, Jr. | 297/344.23 X |
| 4,097,016 A | 6/1978 | Petrucci | |
| 4,123,028 A | 10/1978 | Quakenbush | |
| 4,134,617 A | 1/1979 | Matsubara | |
| 4,227,670 A | 10/1980 | Vander Burgh | |
| 4,274,503 A | 6/1981 | Mackintosh | |
| 4,278,144 A | 7/1981 | Perin | |
| 4,351,562 A | 9/1982 | Twitchell | |
| 4,450,927 A | 5/1984 | Hirata | |
| 4,480,867 A | 11/1984 | Ezell | |
| 4,487,445 A | 12/1984 | Johnston | |
| 4,518,139 A | 5/1985 | Barfell | |
| 4,552,250 A | 11/1985 | Luebrecht | |
| 4,570,997 A | 2/1986 | Tanizaki | |
| 4,600,239 A | 7/1986 | Gerstein | |
| 4,671,572 A | 6/1987 | Young | |
| 4,705,256 A | 11/1987 | Hofrichter | |
| 4,730,691 A | 3/1988 | Grigg | |
| 4,733,903 A * | 3/1988 | Bailey | 297/344.24 X |
| 4,802,706 A * | 2/1989 | Onimaru et al. | 297/330 X |
| 4,809,180 A | 2/1989 | Saitoh | |
| 4,812,838 A | 3/1989 | Tashiro | |
| 4,815,785 A | 3/1989 | Goodall | |
| 4,846,529 A | 7/1989 | Tulley | |
| 4,969,685 A | 11/1990 | Chihaya | |
| 5,127,621 A * | 7/1992 | Uecker et al. | 297/344.22 |
| 5,127,699 A | 7/1992 | Maezawa | |
| 5,161,765 A | 11/1992 | Wilson | |
| 5,341,894 A | 8/1994 | Van Gorder, Jr. | |
| 5,346,035 A | 9/1994 | Ueda | |
| 5,409,079 A | 4/1995 | Strong | |
| 5,482,354 A | 1/1996 | Gryp | |
| 5,568,960 A | 10/1996 | Oleson | |
| 5,584,460 A | 12/1996 | Ropp | |
| 5,730,236 A | 3/1998 | Miller | |
| 5,788,015 A | 8/1998 | Seng | |
| 5,839,542 A | 11/1998 | Seng | |
| 5,860,488 A | 1/1999 | Kim | |
| 5,890,764 A | 4/1999 | Lee | |
| 5,895,093 A | 4/1999 | Casey | |
| 5,921,340 A | 7/1999 | Abels | |
| 5,941,498 A * | 8/1999 | Hoshihara et al. | 297/344.22 X |
| 5,951,106 A * | 9/1999 | Hirama et al. | 297/344.22 |
| 5,992,935 A * | 11/1999 | Duijnstee | 297/344.22 X |
| 6,009,357 A | 12/1999 | Wellman | |
| 6,027,170 A | 2/2000 | Benz | |
| 6,039,141 A * | 3/2000 | Denny | 180/329 |
| 6,064,932 A | 5/2000 | Francois | |
| 6,086,142 A | 7/2000 | Simmons | |
| 6,168,234 B1 * | 1/2001 | Haynes et al. | 297/344.23 |
| 6,186,573 B1 | 2/2001 | Thurab | |
| 6,189,964 B1 | 2/2001 | Henshaw | |
| 6,196,630 B1 | 3/2001 | Cheng | |
| 6,267,071 B1 | 7/2001 | Ellis | |
| 6,283,504 B1 * | 9/2001 | Stanley et al. | 297/217.2 X |
| 6,302,483 B1 | 10/2001 | Ricaud | |
| 6,361,111 B1 | 3/2002 | Bowers | |
| 6,446,758 B1 | 9/2002 | Schatz | |
| 6,533,076 B1 | 3/2003 | Haverfield | |
| 6,533,321 B1 * | 3/2003 | Class et al. | 280/806 |
| 6,536,825 B1 | 3/2003 | McAndrew | |
| 6,536,842 B1 | 3/2003 | Bowers | |
| 6,540,250 B1 | 4/2003 | Peterson | |
| 6,543,848 B1 * | 4/2003 | Suga et al. | 297/344.24 |
| 6,563,761 B1 | 5/2003 | Schaffran et al. | |
| 6,564,896 B1 | 5/2003 | Proksch | |
| 6,564,906 B1 | 5/2003 | Haack | |
| 6,572,172 B1 * | 6/2003 | Ninomiya et al. | 297/344.23 X |
| 6,578,854 B1 | 6/2003 | Wucherfennig | |
| 6,678,601 B1 * | 1/2004 | Whinnery | 297/330 X |
| 6,679,349 B1 | 1/2004 | Pollish | |
| 6,731,088 B1 * | 5/2004 | Nivet | 297/330 X |
| 6,814,174 B1 * | 11/2004 | Fluent et al. | 297/344.22 X |
| 2002/0125988 A1 | 9/2002 | Nagasaka | |
| 2002/0145315 A1 * | 10/2002 | Fraley et al. | 297/216.13 |
| 2003/0001404 A1 | 1/2003 | Michel | |
| 2003/0019684 A1 | 1/2003 | Wucherpfennig et al. | |
| 2003/0057755 A1 | 3/2003 | Brandt | |
| 2003/0062753 A1 | 4/2003 | Chao | |
| 2003/0090133 A1 * | 5/2003 | Nathan et al. | 297/217.3 |
| 2003/0127272 A1 | 7/2003 | Baker | |
| 2003/0189370 A1 | 10/2003 | Hemmer | |
| 2003/0230447 A1 | 12/2003 | Wulfert | |
| 2003/0230920 A1 | 12/2003 | Itou | |
| 2004/0080204 A1 * | 4/2004 | Enomoto et al. | 297/480 |
| 2004/0173409 A1 | 9/2004 | Hock | |
| 2004/0211616 A1 | 10/2004 | Ueda et al. | |
| 2004/0262961 A1 * | 12/2004 | Young et al. | 297/217.3 |
| 2005/0006939 A1 * | 1/2005 | Hancock et al. | 297/354.12 |
| 2005/0073184 A1 * | 4/2005 | Tsuji et al. | 297/284.1 |

FOREIGN PATENT DOCUMENTS

| | | |
|---|---|---|
| DE | 3317340 A1 | 11/1984 |
| DE | 36 25 057 A1 | 1/1988 |
| DE | 4203150 A1 | 8/1993 |
| DE | 4309894 A1 | 10/1993 |
| DE | 4415933 A1 | 11/1994 |
| DE | 19512284 A1 | 10/1996 |
| DE | 19730131 | 4/1999 |
| DE | 19650338 | 7/1999 |
| DE | 19742666 A1 | 8/1999 |
| DE | 10050580 A1 | 4/2001 |
| EP | 0369951 B1 | 9/1992 |
| EP | 0317520 B1 | 6/1993 |
| EP | 0 670 239 A1 | 9/1995 |
| EP | 0600453 B1 | 5/1996 |
| EP | 0548450 B1 | 8/1996 |
| EP | 0847893 A2 | 6/1998 |
| EP | 0960850 A2 | 12/1999 |
| EP | 1002760 A1 | 5/2000 |
| EP | 1070627 A2 | 1/2001 |
| EP | 0988249 B1 | 3/2001 |
| EP | 1186466 A1 | 3/2002 |
| EP | 1264940 A1 | 12/2002 |
| EP | 0812722 B1 | 5/2003 |
| EP | 1367474 A2 | 12/2003 |
| EP | 1386777 A1 | 4/2004 |
| FR | 2544973 | 11/1984 |
| FR | 2678871 | 1/1993 |
| FR | 2690320 A1 | 10/1993 |
| FR | 2776583 | 1/1999 |
| FR | 2796014 | 1/2001 |
| FR | 2828846 | 2/2003 |
| FR | 2828847 | 2/2003 |
| GB | 1022623 | 3/1966 |
| GB | 2301620 B | 7/1997 |
| GB | 2301026 B | 2/1999 |
| GB | 2300119 B | 3/1999 |
| GB | 2308058 B | 6/1999 |
| GB | 2345633 B | 9/2000 |
| GB | 2 396 102 A | 6/2004 |
| JP | 3178839 | 8/1991 |
| JP | 4300738 | 10/1992 |

| | | | | |
|---|---|---|---|---|
| JP | 04358931 A | * | 12/1992 | ............ 297/344.22 |
| JP | 06001171 A | * | 1/1994 | ............ 297/344.23 |
| WO | WO 96/10817 A1 | | 4/1996 | |
| WO | WO 01/64576 A1 | | 9/2001 | |
| WO | WO 01/68400 A1 | | 9/2001 | |
| WO | WO 02/40311 A1 | | 5/2002 | |

OTHER PUBLICATIONS

Crown specification brochure entitled 40TSP Turret Sideloader, 4000 lb capacity, Series TS, SF12182, Rev. Jul. 2000.

Raymond advertisement brochure No. SIPD-0046 30M CP entitled EASi Operator-Up Swing-Reach Truck for Maximum Productivity and Flexibility, Jun. 1995 USA.

Yale advertisement brochure No. 2447-1/01-30 entitled Yale Very Narrow Aisle, 2001 USA.

OM PIMESPO advertisement brochure entitled Turret Trucks (man up) DUAL, 5 pgs.

Linde advertisement brochure entitled Electric Man-up Combination Truck (Order Picking/Turret) 1000 kg., 2 pgs.

Jungheinrich advertisement brochure entitled The new Jungheinrich High Rack and Order Picking Stacker ETX-KOMBI 125/150K/150 L, 2 pgs.

Hyster Company advertisement brochure V30-35/XMU Turret Trucks, INTRODUCING: The Vanguard of High Density; Part No. V3U-35BTG Jan. 1999.

Dambach advertisement brochure entitled Order Picking Stackers The Hi-Racker, Sep. 2000, Germany, 8 pgs.

Narrow Aisle Limited advertisement brochure entitled Combi Double Deep, 1994, England, 2 pgs.

Jungheinrich advertisement brochure entitled 3 Phase AC, Germany.

News article featuring Translift's Bendi BE40.

Crown Operator Manual No. PF12495. Rev. Apr. 2001 entitled Crown T3 Series, USA.

Crown advertisement brochure No. SF4312 Rev. Jun. 1998 entitled Turret Sideloader, USA.

Linde advertisement brochure entitled Electric Man-up Combination Truck (Order Picking/Turret 1350 kg.

Translift photographs of Smart Bendi Task Positionable Swing Cabs.

Valtra photographs of Task Positionable Swing Seat.

Fiori Spa advertisement brochure for D40 dumper, Italy.

Valtra photographs for Ergocab and TwinTrac.

New Holland photographs of the TV 140 Turnabout console.

Magazine article from iVT International, Sep. 2002, showing Still's R60 counterbalance trucks, 1 pg.

Jungheinrich advertisement brochure entitled Jungheinrich High Rack Stacker Capacity 1250 kg ETXac 125, 1 pg.

Advertisement for ACROBA, 1 pg.

Photograph of a CAT seat, 1 pg.t.

Vermeer rotating seat Advertisement, 1 pg.

Crown specification brochure No. SF12183 entitled TSP Series turret stockpicker, Apr. 2002 USA.

Crown Operator Manual for TSP Series No. PF12496 Jul. 2001, USA.

Crown specification brochure for model 30TSP Turret Stockpicker, 3000 lb. capacity, 5 pgs.

* cited by examiner

SEAT REPOSITIONING DEVICE WITH RELEASE ON CONTROL HANDLE

CROSS REFERENCE TO RELATED APPLICATIONS

The present application is related to U.S. patent application Ser. No. 10/948,500, entitled "Rotating and Swiveling Seat", which is filed currently herewith and hereby incorporated by reference.

BACKGROUND OF THE INVENTION

The present invention relates in general to working vehicles such as materials handling vehicles, construction vehicles and agricultural vehicles, and more particularly to seat repositioning systems for such vehicles.

A material handling vehicle, such as a turret stockpicker, typically includes a platform having an operator's seat and a number of control elements that are located in the vicinity of the seat within reach of the vehicle operator's hands and/or feet. The control elements typically include steering and traction controls for navigating the vehicle and various switches and levers, which are provided for operating the load handling features of the vehicle. For example, the traction control elements typically include travel direction and speed controls that can be operated in cooperation with brake pedals arranged on the platform floor proximate to the operator's seat. Additionally, load handling control elements may be provided, such as for performing primary mast raise and lower functions and for pivoting and traversing the forks.

Depending upon the task being performed, it may be advantageous for the vehicle operator to have a field of view greater than that typically provided by a fixed, forward facing seat position. For example, turret stockpickers are equipped with a swing mast that allows the orientation of the forks to be rotated by approximately 180 degrees. Thus, the turret stockpicker can travel down narrow warehouse aisles and pick/putaway stock from either side of a given aisle. At times during such operations, the operator may desire to have a field of view that includes forward, side or rearward directions. To this end, the operator's seat may be made to rotate to provide adjustable operating positions. However, an operator in a seated position must typically reach down beneath a seat bottom to operate a handle or lever in order to reposition the operator's seat. The positioning of the release handle under the operator's seat is also common for releasing/controlling the forward and backward positioning of such seats. In many applications, it can be very difficult if not impossible to operate other control elements such as the traction controls or load handling features while attempting to also operate a lever or handle underneath the seat to attain a given seat position.

SUMMARY OF THE INVENTION

The present invention provides seat repositioning systems that can be easily and quickly adjusted. The seat repositioning systems comprise a seat release control such as a switch, button or other actuation device that is controllable to cause an operator's seat to be released from a current locked position. Once unlocked, the operator's seat may be rotated or otherwise relocated to a new position, whereupon the operator's seat may be locked into its new position.

The seat release control may be placed on a control handle that is integrated into an armrest of the operator's seat. Under this arrangement, the vehicle operator may reposition the operator's seat without letting go of the control handle, which may further support traction controls, steering controls and/or other elements that control the load handling and other features of the vehicle. Still further, control systems may be provided on the vehicle that determine whether the operator's seat may be rotated or unlocked based upon predetermined operational parameters, e.g., load handling or maneuvering features or conditions of the vehicle. Additionally, the control systems may influence one or more operational parameters of the vehicle based at least in part, by a state of the operator's seat, e.g., whether the operator's seat is locked or unlocked, and/or based upon the rotated position of the operator's seat. For example, the vehicle may not allow the operator's seat to be unlocked if the speed of the vehicle exceeds a predetermined velocity. As another example, the vehicle may not allow certain features, e.g., traction and/or load handling features to be enabled if the operator is standing and/or the seat is rotated to a predetermined range of positions.

BRIEF DESCRIPTION OF THE SEVERAL VIEWS OF THE DRAWINGS

The following description of the preferred embodiments of the present invention can be best understood when read in conjunction with the following drawings, where like structure is indicated with like reference numerals, and in which.

DETAILED DESCRIPTION OF THE INVENTION

In the following description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
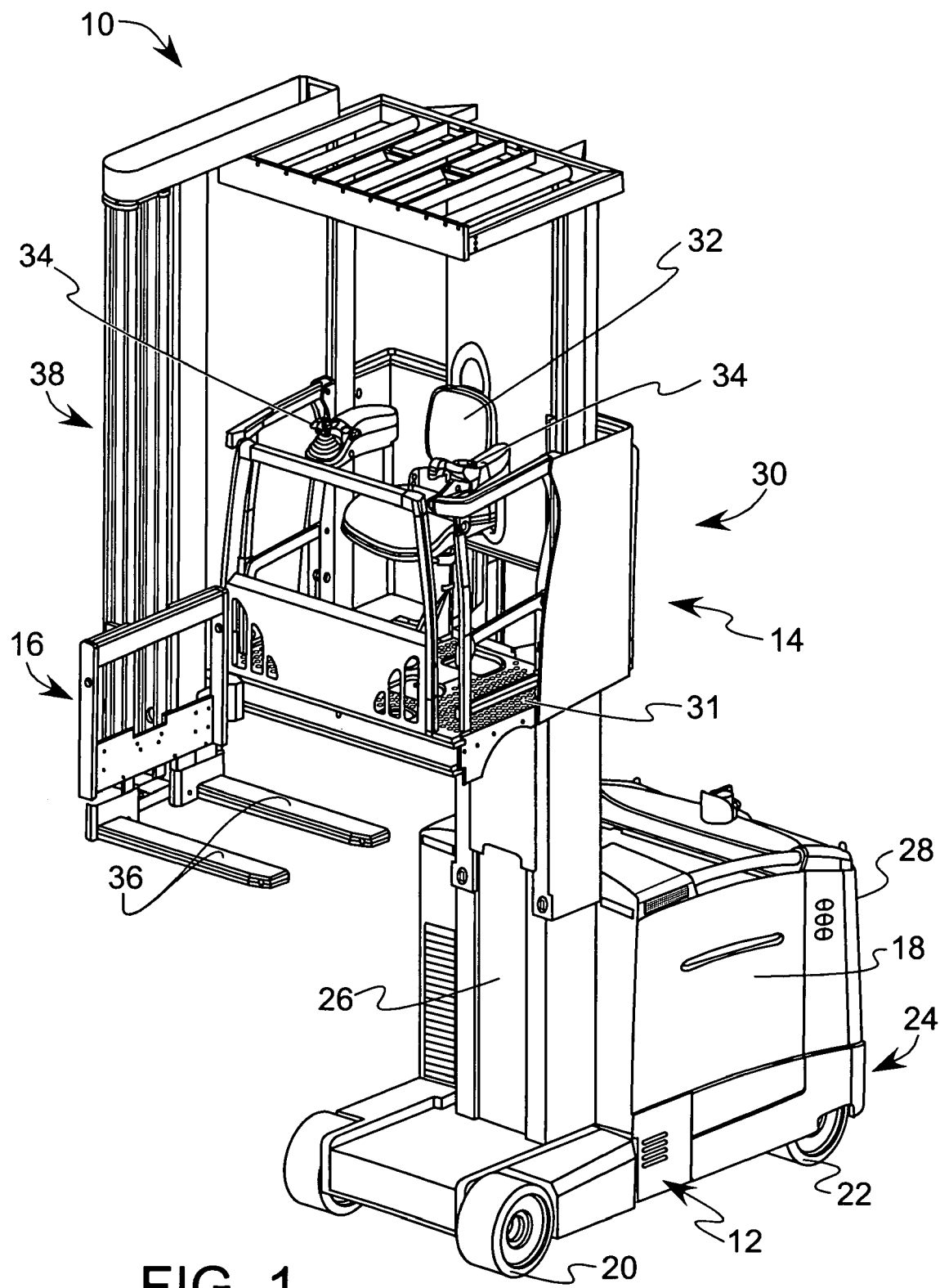
FIG. 1 is a perspective view of an exemplary material handling vehicle according to the present invention.

Referring now to the drawings, and particularly to FIG. 1, a materials handling vehicle 10, such as a turret stockpicker, typically includes a power unit 12, an operator platform assembly 14, and a load handling assembly 16. The power unit 12 includes a first compartment 18 for housing a power source, such as a battery, a pair of load wheels 20 positioned under the operator platform assembly 14, one or more drive wheels 22 (a pair of drive wheels 22 are shown) positioned under the rear end 24 of the power unit 12, a main mast 26 on which the operator platform assembly 14 may be raised and lowered, and an electronic control unit 28 that typically controls one or more traction motors (not shown), each traction motor corresponding to an associated drive wheel 22.

The platform assembly 14 includes an operator's compartment 30 having a platform floor 31, an operator's seat 32 and a plurality of control elements 34 for driving the vehicle 10, controlling the features of the load handling assembly 16 and for performing other tasks related to the operation of the vehicle 10. In FIG. 1, the control elements 34 are shown as being positioned on the armrests of the operator's seat 32. However, control elements 34 may also be positioned proximate to the operator's seat 32 and foot actuated controls such as vehicle brake, direction and acceleration pedals can be placed on the platform floor 31. Additionally, buttons, levers and other controls may be panel mounted or otherwise positioned within the operator's compartment 30, preferably within reach of an operator sitting in the operator's seat 32.

The load handling assembly 16 includes a pair of lift forks 36 that may be raised and lowered along an auxiliary mast 38. Moreover, the auxiliary mast 38 may be traversed back and forth across the front of the operator's compartment 30, and the lift forks 36 may be rotated in an arc of approximately 180 degrees relative to the auxiliary mast 38.

Figure 2:
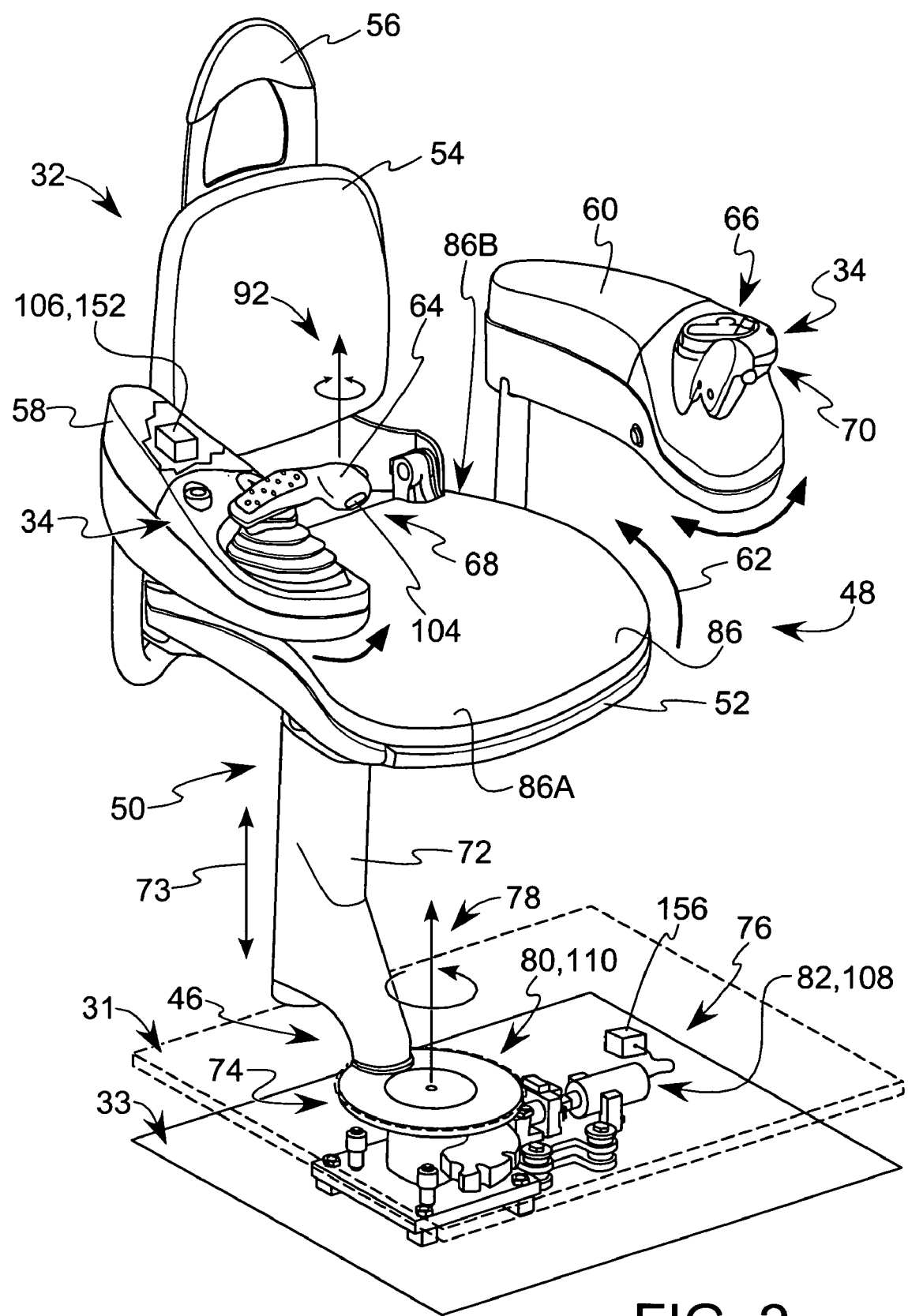
FIG. 2 is a perspective view of an operator's seat for an exemplary material handling vehicle according to the present invention.

Referring to FIG. 2, the operator's seat 32 includes generally, a base structure 46 coupled to an operator support 48 by an intermediate member 50. The operator support 48 comprises a seat bottom 52, a seat back 54, and a head rest 56. The seat bottom 52 may be hingedly supported so as to be repositionable from a substantially horizontal position or seat down position (as shown) to a substantially vertical position or seat up position (see FIG. 9) by pivoting the seat bottom 52 in the direction of arrow 62. In the seat down position, the seat bottom 52 provides a suitable support surface upon which the vehicle operator may sit. In the seat up position, the seat bottom 52 may be vertically adjusted to provide a suitable support surface upon which the vehicle operator may lean when the vehicle operator is operating the vehicle in a standing position.

The operator's seat further includes a right armrest 58 and a left armrest 60. The right and left armrests 58, 60 optionally pivot or are otherwise repositionable with respect to the seat bottom 52 and seat back 54. For example, the right armrest 58 may be mounted for inward pivotal movement and the left armrest 60 may be mounted for both outward and inward pivotal movement as indicated by the directional arrows adjacent to each armrest 58, 60, where outward pivotal movement is defined as being away from the seat bottom 52. The above arrangement allows the left armrest 60 to be moved out and away from the seat bottom 52 for ease of ingress and egress to the operator' seat 32, e.g., when performing tasks such as parts picking where the operator requires mobility within the compartment 30. Additionally, as noted above, the seat bottom 52 is mounted for vertical pivoting movement in the direction of arrow 62 relative to the seat back 54 (between seat up and down positions). As will be described in greater below, the height of the seat bottom 52 and the armrests 58, 60 may be made adjustable to facilitate standing and seated operation of the vehicle 10 while maintaining easy access to the operative control elements 34 in either position.

The control elements 34 are operatively configured to control designated functions related to the operation of the vehicle 10 and may comprise single controls or the control elements 34 may be incorporated into multifunction controls. The control elements 34 may include for example, buttons, levers, switches, joysticks, jog wheels, throttles, potentiometers, encoders and other controls. The control elements 34 collectively provide the functionality necessary to navigate the vehicle, operate the load handling features of the vehicle, and/or operate other features related to the performance of specific tasks.

For example, the control elements 34 may comprise a traction control arm 64 for controlling direction of movement as well as acceleration and deceleration of the vehicle 10, and a steering tiller 66, e.g., a finger operated tiller disk having a pop-out handle, for steering the vehicle 10. The traction control arm 64 and the steering tiller 66 may thus be operated in combination with brake pedals (not shown) to drive the vehicle 10. Lever controls 68, 70 may provide variable control between predetermined minimum and maximum values for controlling traversing and rotation of the forks 36, and/or raising and lowering the primary and auxiliary masts 26, 38. Integrated hand sensors 71 (see FIG. 5), e.g., optical sensing elements, may be provided in the lever controls 68, 70 (or any of the other control elements 34) to ensure that the operator's hands are maintained within the operator's compartment 30 during predetermined operations, e.g., while performing certain load handling functions. Moreover, control elements 34 may be provided to operate other command and control features, such as to sound a horn or other audible or visual signal, to operate a fan, communications link, light, scanner technology, or provide any other desired function necessary to perform a given task.

Still further, the operator support 48 may swivel about a swivel axis 92 (see FIG. 2) as set out in greater detail in U.S. patent application Ser. No. 10/948,500, titled "Rotating and Swiveling Seat", which is incorporated by reference herein.

The intermediate member 50 includes generally, a first frame member 72 that extends substantially vertically between the base structure 46 and the operator support 48. The intermediate member 50 allows the height of the seat bottom 52 and seat back 54 to be adjustable as indicated by directional arrow 73, e.g., using a gas cylinder (not shown) to accommodate the varying physical characteristics of anticipated vehicle operators. The ability to adjust the height of the operator support 48, including the seat bottom 52 and armrests 58, 60 further allows the operator to reposition the control elements on the right and left armrests 58, 60 to an appropriate position when operating the vehicle 10 in standing or sitting positions.

The base structure 46 comprises a mounting member 74 that couples the first frame member 72 and a seat release system 76. The seat release system 76 allows the operator's seat 32 to be rotatable (at least partially) about a substantially vertical axis 78 as will be explained in greater detail below. The seat release system 76 is located underneath the platform floor 31 and may be bolted or otherwise secured to a platform base 33 or other suitable structure. Thus the mounting member 74 is generally coplanar relative to the platform floor 31.

The seat release system 76 comprises a locking arrangement that includes generally, a rotate assembly 80 and a release assembly 82 as shown. The rotate assembly 80 may include one or more designated locking positions such that when the operator's seat 32 is transitioned to a select one of the designated locking positions and the release assembly 82 is not activated, the operator's seat 32 is locked into that designated position (best seen in FIG. 8). Correspondingly, the release assembly 82 is operable to unlock the rotate assembly 80 for repositioning the operator's seat 32 with respect to the platform floor 31. When the operator's seat 32 is repositioned into a new one of the designated locking positions and the release assembly 82 is deactivated, the operator's seat is locked into position. If the release assembly 82 is deactivated before the operator's seat 32 is oriented with respect to one of the designated locking positions, the operator's seat 32 may lock into the next encountered locking position. As an alternative to designated locking positions, the rotate assembly 80 may be lockable in any continuously variable position within the range of rotation of the operator's seat 32, an example of which is described in greater detail below with reference to FIG. 11.

The axis 78, defining the rotation axis for the operator's seat 32 with respect to the platform floor 31, is positioned generally forward under the seat bottom 52 when the seat bottom 52 is in the seat down position as shown in FIG. 2. As such, the axis 78 is spaced radially away from the center of gravity anticipated by a typical operator sitting in the operator's seat. However, as noted above, the seat release system 76 is lockable into designated positions. As such, inertial forces that may tend to rotate the operator's seat 32 during operation of the vehicle 10 are mitigated.

Figure 3:
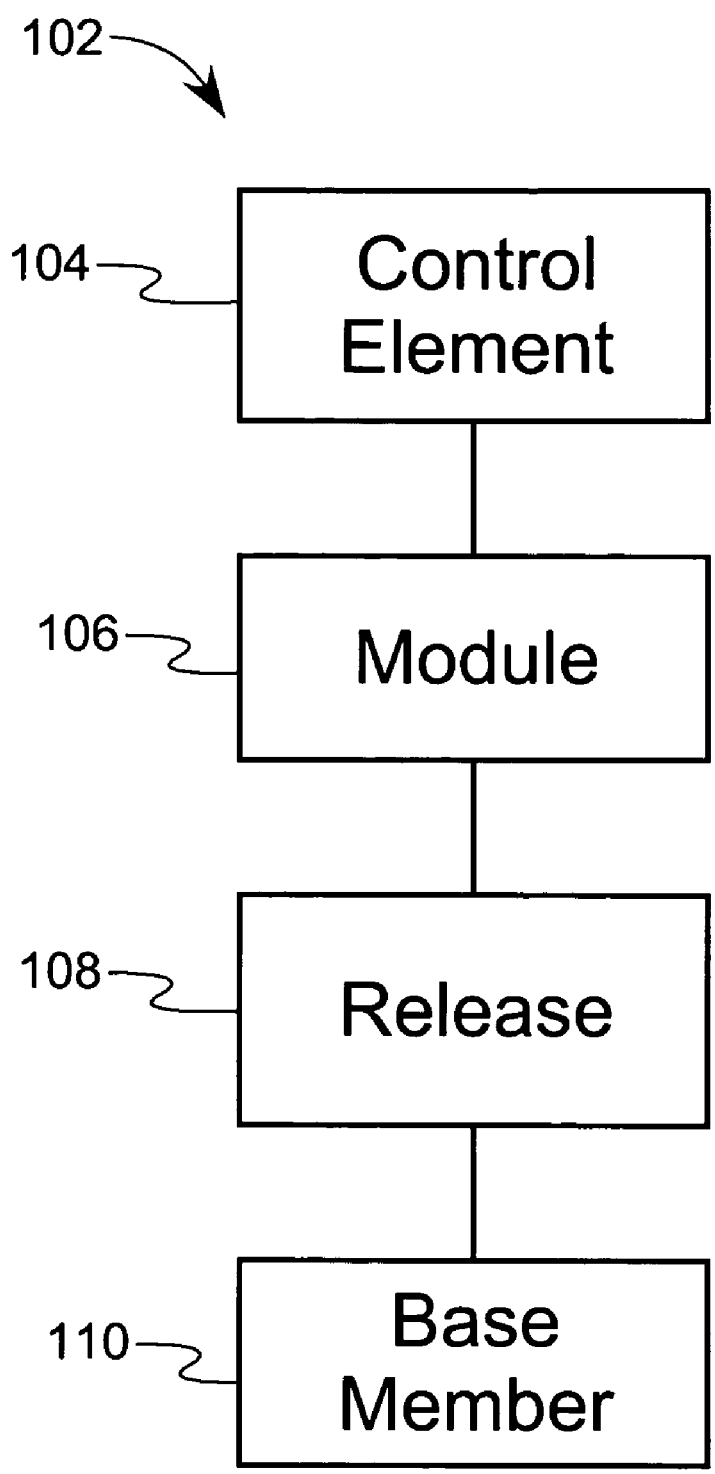
FIG. 3 is a block diagram of a system for repositioning an operator's seat of a materials handling vehicle.

Referring to FIG. 3, a block diagram illustrates a system 102 for repositioning the operator's seat 32 of the material handling vehicle 10. The system 102 comprises a seat release element 104, e.g., which may be implemented as any one or more control elements 34 described above with reference to FIGS. 1–2 including a button, lever, switch, etc. The seat release element 104 is coupled to a module 106 that includes the necessary logic, including hardware and/or software, to operate a release 108 based upon the input from the seat release element 104. As such, an electrical coupling arrangement is realized between the seat release element 104 and the release 108. Alternatively, a mechanical coupling, e.g., cable, or other suitable linkages, may be implemented between the seat release element 104 and the release 108.

The release 108 interacts with a base member 110 of the operator's seat 32 so as to lock and unlock the base structure 46 of the operator's seat 32 for rotational movement with respect to the platform floor 31. One exemplary implementation of the release 108 and base member 110 are shown in FIG. 2. With brief reference thereto, the release 108 may correspond to the release assembly 82 and the base member 110 may correspond to the rotate assembly 80. Referring back to FIG. 3, the orientation of the release 108 with respect to the base member 110 may define at least two states. A first state defines a locked state wherein the base member 110 is restricted from significant rotational movement with respect to the release 108. A second state defines an unlocked state wherein the base member 110 is rotatable with respect to the release 108. For example, when the release 108 is in an unlocked state relative to the base member 110, the base member 110 may be rotated between two or more desired positions.

In one illustrative embodiment, such as the embodiment of FIG. 3, actuating the seat release element 104, e.g., depressing a button, instructs the module 106 to transition the release 108 from the first (locked) state to the second (released) state for as long as the seat release element 104 is held actuated. While in the released state, designated by the maintained actuation of the seat release element 104, the operator is free to reposition the operator's seat 32 to any of the possible positions. Upon releasing the seat release element 104, the module 106 communicates with the release 108 to enable transition to the first state wherein the base member 110 is locked into place by the release 108. Thus, the module 106 need only comprise a communication medium between the release 108 and the seat release element 104. However, the module 106 may alternatively implement processing, filtering or other manipulation to convert the signal from the seat release element 104 into a suitable control signal for the release 108.

Figure 4:
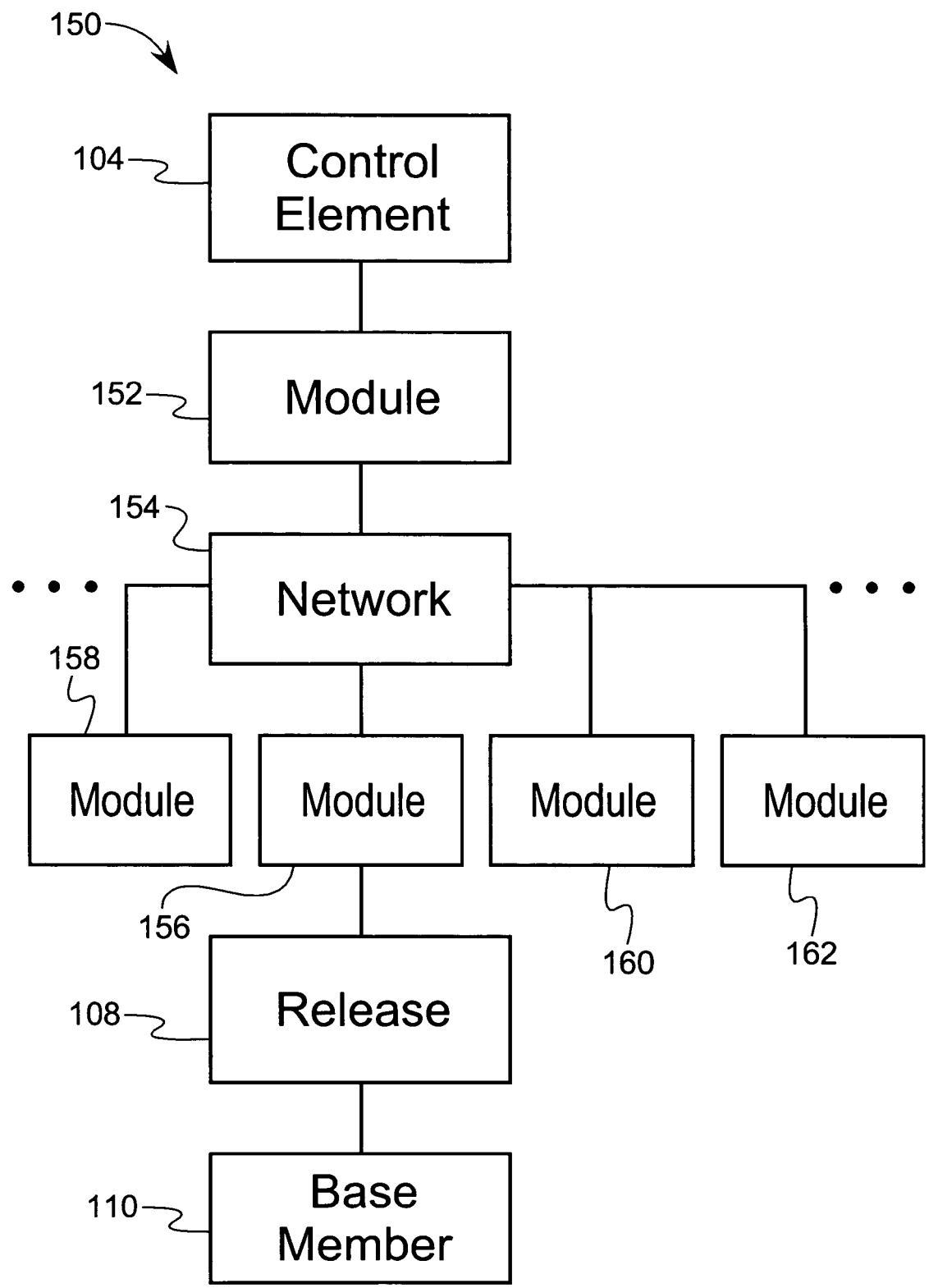
FIG. 4 is a block diagram of a system for repositioning an operator's seat of a material handling vehicle according to another aspect of the present invention.

Referring to FIG. 4, a block diagram illustrates another exemplary system 150 for repositioning the operator's seat 32 of the material handling vehicle 10. The system 150 includes the general functionality of the system 102 discussed with reference to FIG. 3, and further includes the components necessary to implement the system 102 over a network environment. As such, like components are illustrated with like reference numerals.

A seat release element 104 is coupled to a first module 152. The first module 152 includes the necessary logic, including hardware and/or software, to communicate with the seat release element 104. When the first module 152 detects that the seat release element 104 has been actuated, a message is communicated over a network 154, and is received by a second module 156. For example, a Controller Area Network (CAN) may be used to form the network communications link between the first module 152 and the second module 156. The CAN protocol is a convenient network platform for material handling vehicles as there is no addressing of subscribers or stations in the conventional network sense. Rather, the CAN defines a prioritized system of transmitted messages where the priority of a given message broadcast across the CAN is dependent upon an identifier code. That is, the first module 154 broadcasts a message that includes an identifier, and the message to be communicated.

Each message from the first module 152 may compete for bus access with messages generated by other modules on the CAN, and priority will typically be determined based upon the identifier code. However, a message broadcast from the first module 152 can be received by all nodes or modules connected to the CAN. Thus, a message broadcast by the first module 152 is received by the second module 156 as well as other modules, e.g., modules 158, 160, 162, etc., that are connected to the CAN. Each module 152, 156, 158, 160, 162 may be programmed to decide, e.g., based upon the identifier or other information encoded in the received message, whether that module should take action based upon the received messages. The network 154 may alternatively comprise any other bus system or communications link. As such, the first module 154 may broadcast, unicast or otherwise communicate with the second module 156.

The second module 156 includes the necessary logic, including hardware and/or software, to operate the release 108 based upon the message(s) received from the first module 152. The interaction between the release 108 and the base member 110 is substantially as described above with reference to FIG. 3. According to an embodiment of the present invention represented by FIG. 4, the vehicle 10 comprises several modules, e.g., eight or more, that are capable of putting information onto and/or reading information off of the network 154. As will be described in greater detail below, the network 154 allows an efficient means for adding vehicle wide decision making to the seat repositioning operation. For example, certain travel, load handling features or other vehicle operational features can be disabled/enabled or limited while an operator is rotating the operator's seat 32.

As a first example, assume that the module 158 controls operation of the forks 36 on the vehicle 10. Further, assume that commands from the control elements 34 that operate the pivoting and/or traversing of the forks 36 are transmitted across the network 154 and are received by the module 158. The module 158 can be programmed or otherwise configured to temporarily ignore commands to perform select operations with the forks 36 until the operator's seat 32 is returned to a locked or designated position or range of positions. Alternatively, assume that module 152 transmits fork pivot and traverse commands intended for the module 158 in addition to transmitting the seat release commands intended for the second module 156. Under this arrangement, the pivot and traverse commands may be derived from the control elements 34 on the armrests 58, 60 of the operator's seat 32. The first module 152 can be programmed or otherwise configured to ignore any received commands to pivot/traverse the forks 36 from the corresponding control elements 34, or perform any other vehicle functions for that matter, while the operator's seat 32 is unlocked, e.g., as indicated by detecting that the seat release element 104 is engaged. The specific application will likely dictate the vehicle functions that are disabled during seat adjustment operations.

Similarly, the additional modules 160, 162, etc., can transmit additional information to the second module 156 over the network 154, and that additional information may be used to determine whether a request from the first module 152 to release the operator's seat 32 is even permissible. Depending upon the implementation of the vehicle, and the performance requirements thereof, it may be desirable to limit operation of the seat release to when the vehicle is stationary, or traveling at a speed that is below a predetermined threshold, e.g., 2.5 miles per hour (approximately 4 kilometers per hour). As a second example, assume that the module 160 is coupled to a vehicle speed sensor. If the speed of the vehicle 10 exceeds a predetermined threshold, the module 160 can broadcast an appropriate message across the network 154. If the second module 156 receives a message that indicates that the vehicle is traveling in excess of the predetermined speed threshold, the second module may choose to ignore the request from the first module 152 to unlock the operator's seat.

Still further, because the module 160 broadcasts the vehicle speed message to all nodes on the network 154, the first module 152 will also receive the message from module 160. As such, the first module 152 may be configured to refuse to transmit a seat release message if the first module 152 determines that vehicle 10 is traveling above the predetermined threshold speed. The above approach of selectively enabling/disabling seat release and/or other operational parameters associated with predetermined tasks can be applied as the specific application dictates to any number of operational parameters.

The above-described features may also be combined in numerous ways to achieve enhanced operational functionality. As a third example, assume that the module 162 comprises a seat sensor that determines whether the operator is seated or whether the operator is standing. There are circumstances where an operator may prefer to operate the vehicle in a standing position. When the operator is standing however, certain vehicle operations may be disabled or reduced in functionality. Further, standing operation may be prohibited when the operator's seat is rotated into certain, predetermined positions. Assume that the second module 156 receives a request from the first module 152 to release the operator's seat 32. In response thereto, the module 158 may temporarily disable some or all functionality of the forks, but only if the operator is not sitting in the operator's seat 32. Moreover, the second module 156 may not allow the operator's seat 32 to be repositioned if the module 162 indicates that the operator is not seated. Again, since all messages are broadcast to all modules in a CAN network, each module 152, 156, 158, 160, 162, etc., may make decisions or perform functions based upon inputs from any one or more of the remaining modules 152, 156, 158, 160, 162, etc., on the network 154.

The above examples were presented by way of illustration and not by way of limitation to demonstrate the broad flexibility of the present invention and to demonstrate exemplary approaches to integrate seat release commands into the control decisions of other vehicle processes. Moreover, the present invention is not limited to a prescribed number of modules, or to a prescribed functionality of any given module. For example, there can be more modules than disclosed herein. Still further, the system need not operate across a network. Any communications medium may be implemented within the spirit of the present invention.

Figure 5:
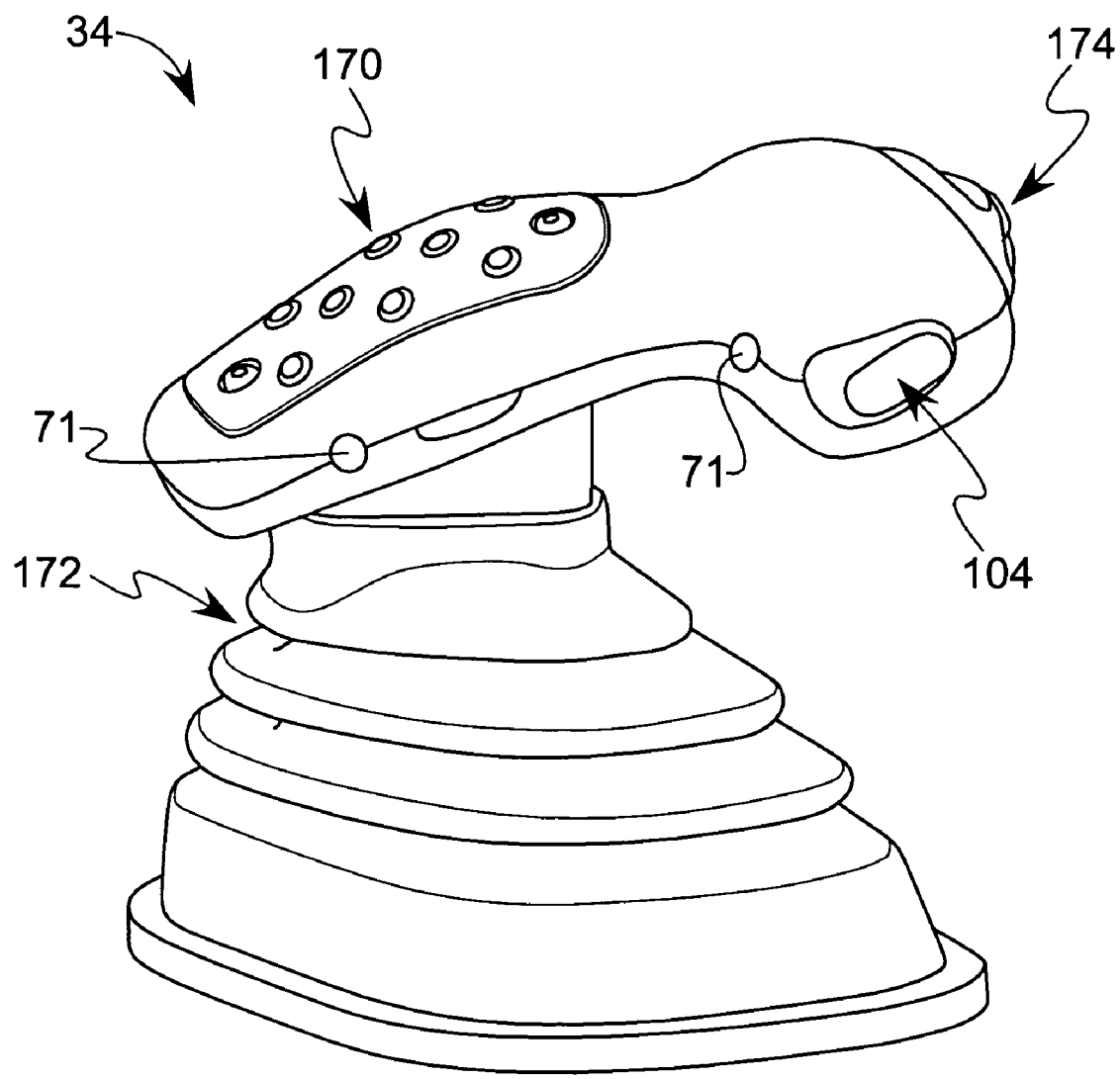
FIG. 5 is a perspective view of a control element on a seat handle of the operator's seat shown in FIG. 2.

Referring to FIG. 5, the seat release element 104 described with reference to FIGS. 3 and 4 may be integrated into, or otherwise positioned proximate to other control element(s) 34, e.g., a joystick, lever, button or multifunction control included on the right and/or left armrests 58, 60 of the operator's seat 32. In the exemplary handle of FIG. 5, it can be seen that the palm of the operator's right hand will typically be resting upon a textured portion of a handle 170 of a joystick 172. The operator's right thumb is positioned to easily operate a thumb-operated control 174. The operator can reach (and actuate) the seat release element 104 by simply lifting and repositioning the right index finger. This can be accomplished without removing the right hand from an operative position with respect to the joystick 172, thumb-operated control 174 and any other controls that may be present on the handle 170. It may also be accomplished without removing the hand from the integrated hand sensors 71.

As shown, the seat release element 104 comprises a spring loaded button. The button may be arranged such that when the button is not being depressed, a first logic signal is communicated to the first module 152 and while a vehicle operator depresses the button, a second logic signal is communicated to the first module 152. The spring bias or other automatic return device on the button thus causes the signal communicated by the button to the first module 152 to return to the first logic state when released by the operator. For example, a logic signal having a first value, e.g., a logic level "1" or +5 volt level, may indicate that the vehicle operator does not desire to release the seat for repositioning. While the operator holds the button in, the vehicle operator indicates a desire to reposition the seat by maintaining the logic signal at a second value, e.g., a logic level "0" or signal that transitions towards the battery negative.

Because of the positioning of the seat release element 104 proximate to other control elements 34, a vehicle operator may adjust or reposition the operator's seat 32 without interrupting the performance of a given task. As best seen in FIG. 2, the seat release element 104 is positioned above a horizontal plane of the armrest, which may assist the vehicle operator in locating and/or activating the seat release element 104 without significantly altering the line of sight of the vehicle operator or without significantly modifying the posture of the vehicle operator. For example, by incorporating the seat release element 104 with other control elements 34, or by placing the seat release element 104 proximate to an operator's working position, i.e., in the vicinity of a hand, arm, leg, etc., the location of the seat release element 104 can be memorized such that an operator can maintain visual focus on a first task while simultaneously adjusting the operator's seat 32. That is, seat dynamics can be blended or performed simultaneously with task control not related to adjustment of the operator's seat 32. In this regard, although the adjustable characteristic of the operator's seat 32 is described herein primarily with reference to the rotation of the operator's seat 32, the seat release element 104 may further be configured to adjust other characteristics of the operator's seat, such as seat height, tilt, or X-Y position relative to the platform floor 31. As such, the above-described examples of integrating seat adjustments with other vehicle operations and other operational tasks can be similarly applied.

Also, as best seen in FIG. 2, the seat release element 104 comprises a button positioned on the right armrest 58 of the operator's seat 32. However, the seat release element 104 may take on forms other than a button. For example, the seat release element 104 may comprise a lever, switch, or any other control that may be selectively actuated or otherwise operated by a vehicle operator. Also, while illustrated as being integrated into a control handle such as a joystick or multifunction control, the button may alternatively be independently positioned or otherwise integrated into a position that is accessible and convenient for the vehicle operator as noted above.

Referring back to FIG. 2, the first module 152 may comprise a logic device that is positioned in the corresponding armrest 58, 60 of the operator's seat 32. Thus the first module 152 may handle communication between the network 154 and all of the control elements 34 including any joysticks, levers, switches, toggles or other control elements in the corresponding armrest 58, 60. Correspondingly, the second module 156 may be positioned proximate to the seat release 76, 108.

When the seat release element 104 is actuated, the change in the logic level derived from the seat release element 104 is detected at the first module 152. The first module 152 then assembles an appropriate message, which is subsequently broadcast across the network 154. As noted above, the first module 152 may have to assign a priority, node identification information, or some other type of identification, which is communicated to the second module 156. The first module 152 may periodically broadcast a seat release command for as long as the operator maintains the operative control in an actuated state, or alternatively, the first module 152 may broadcast a first message indicating that the seat release element 104 has been actuated, and a second message when the seat release element 104 is released to its default position.

Figure 6:
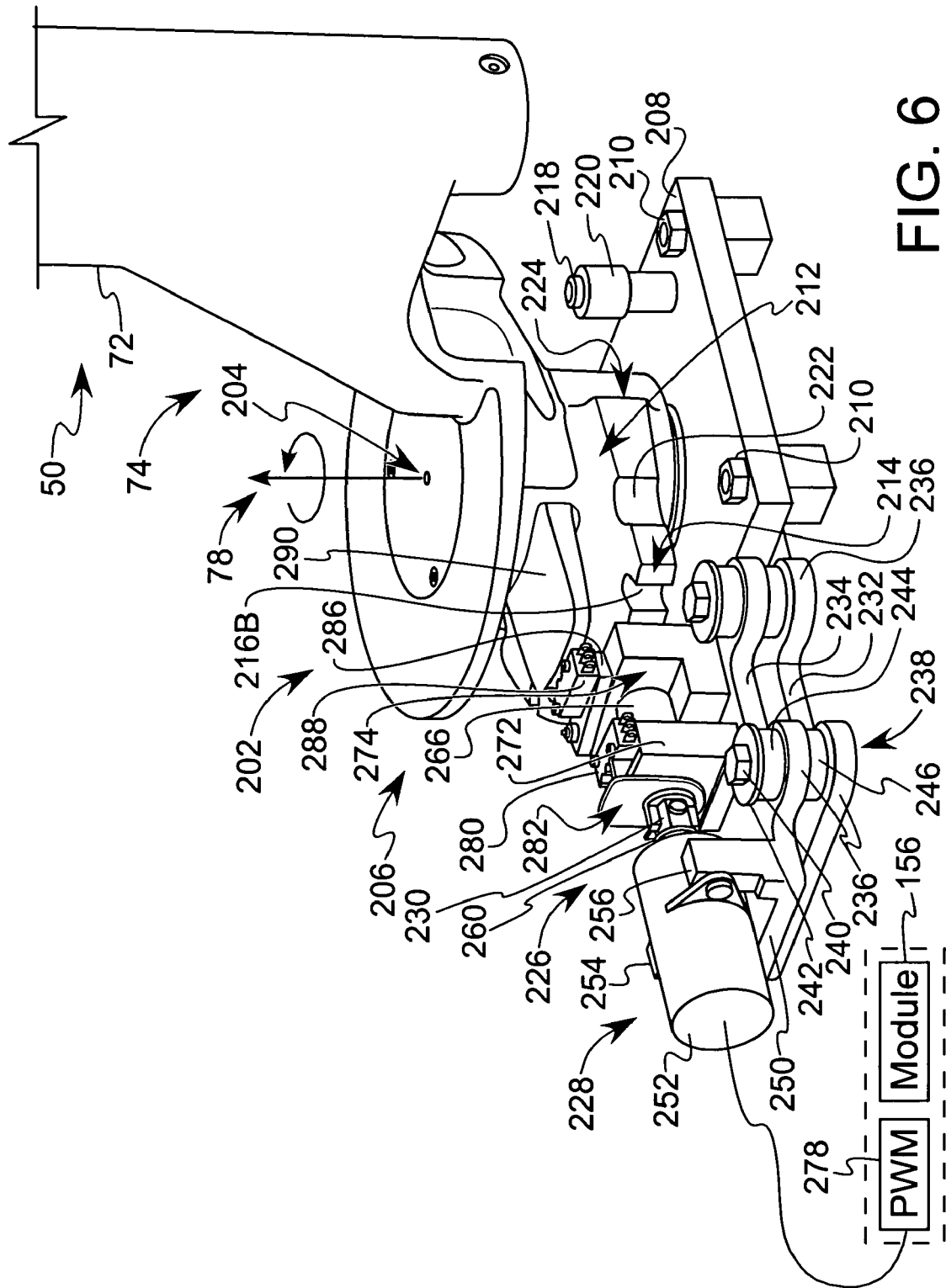
FIG. 6 is a perspective view of an electro-mechanical device for controlling the repositioning of the operator's seat of FIG. 2.
Figure 7:
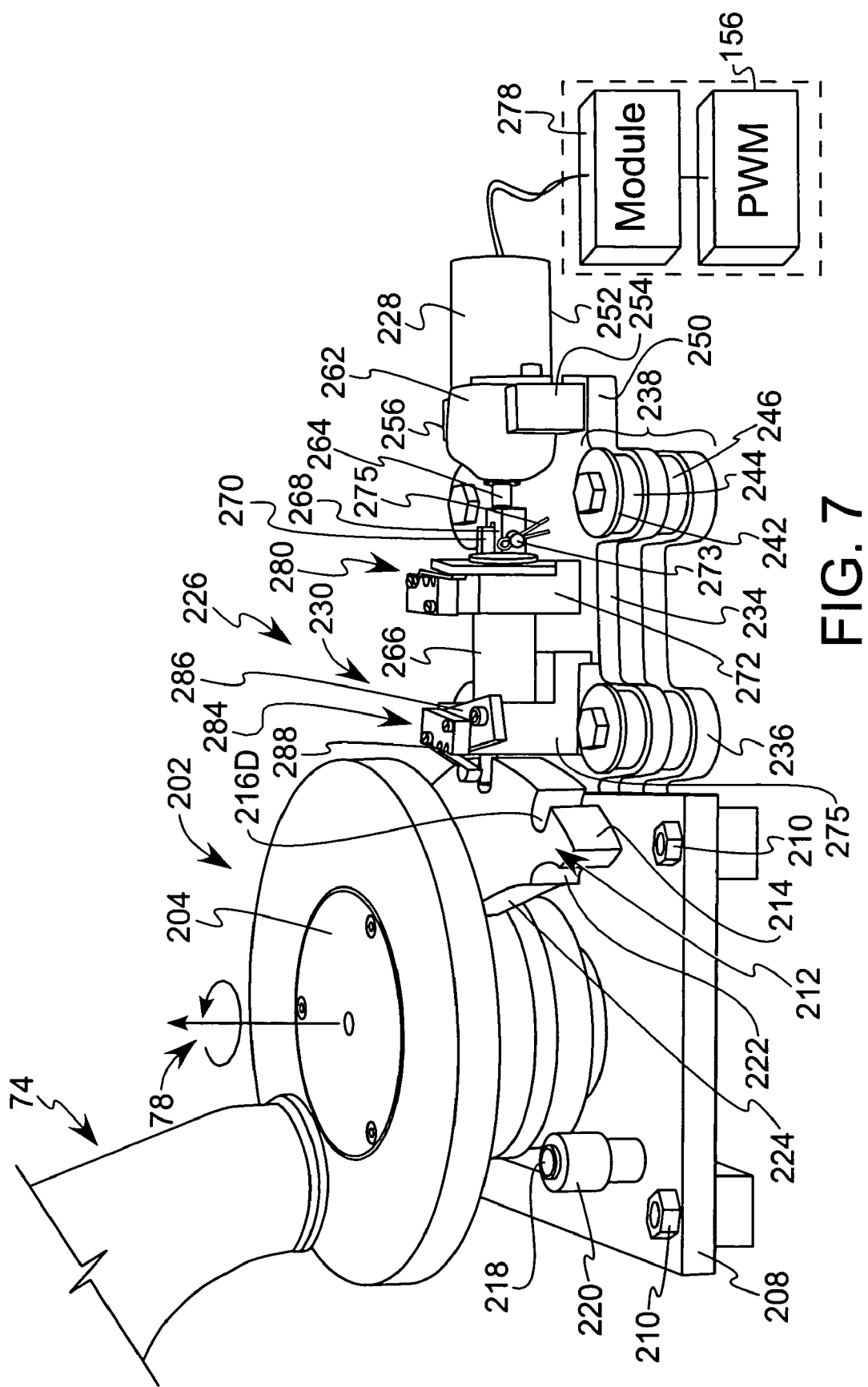
FIG. 7 is an alternative perspective view of the device of FIG. 6.
Figure 8:
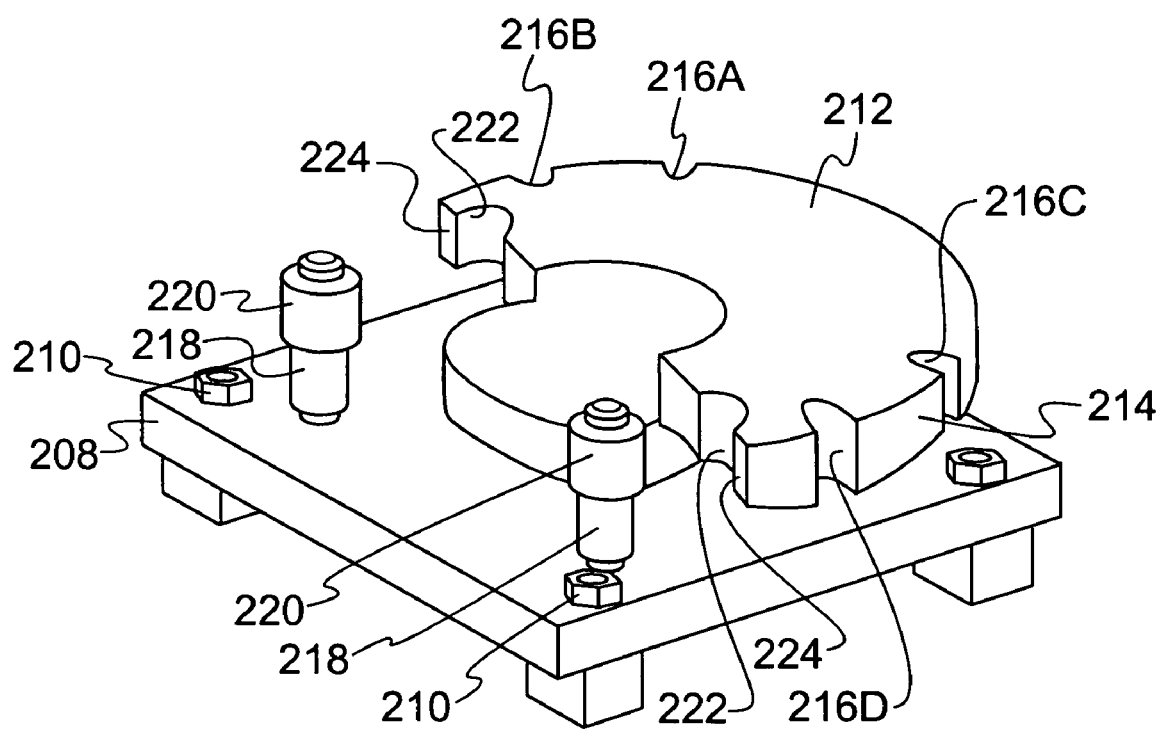
FIG. 8 is a top perspective view of the device of FIG. 6 with a portion of the device cut away to clarify the configuration of a locking member of the device.

Referring to FIGS. 6–8, the second module 156 may comprise a vehicle control module (VCM), which is further responsible for performing other functions related to the operation of the vehicle 10. The VCM can be positioned in any practical position with respect to the vehicle. However, it may be convenient to position the VCM in the platform of the operator's compartment 30 in relatively close proximity to where the operator's seat 32 is located. According to one embodiment of the present invention, the VCM is located in the lower left hand corner of the platform of the operator's compartment 30 from the operator's perspective when facing forward towards the forks 36.

The VCM receives the seat release command that has been broadcast across the network 154 and then determines whether to ignore the command, or to honor the request to release the operator's seat 32. As noted above, the VCM may selectively determine whether to release the operator's seat 32 based upon messages from other modules on the network 154. Such messages may address vehicle physical conditions, e.g., vehicle speed, position of the masts 26, 38, the forks 36 or any other condition that can be communicated to the VCM. Additionally, the VCM (or other modules on the network 154) may elect to temporarily disable working implements, e.g., the load handling features of the vehicle, while the operator's seat 32 is released, as noted above. For example, the VCM, or another module in communication with the VCM, may disable the hydraulics including the forks 36, or other load handling features if the operator's seat 32 is not in a locked position.

As seen in FIG. 6, the vertical frame member 72 of the intermediate member 50 couples via the mounting member 74 to a seat base assembly 202 that includes a bearing shaft 204 and a rotate assembly 206. As will be seen, the rotate assembly 206 may be rotated about the bearing shaft 204 thus rotating the operator's seat 32. The seat base assembly 202 further includes a mounting plate 208 that couples to the platform of the assembly 14 including the operator's compartment 30 via bolts 210. However, welds, fasteners or other securing methods may be used to secure the mounting plate 208 to the platform assembly 14.

The rotate assembly 206 further includes a lock disk 212, which may be provided as an integral part of the casting of the rotate assembly 206, or the lock disk 212 may be secured to the rotate assembly 206 by other suitable means, e.g., welding, bolting, bonding or other securing methods. The lock disk 212 includes a periphery 214 having one or more locking positions, e.g., detents 216 provided along the periphery 214 for providing the seat locking function as will be described in greater detail herein. The lock disk 212 thus defines one illustrative example of a component of the base member 110 discussed with reference to FIGS. 3 and 4.

Figure 11:
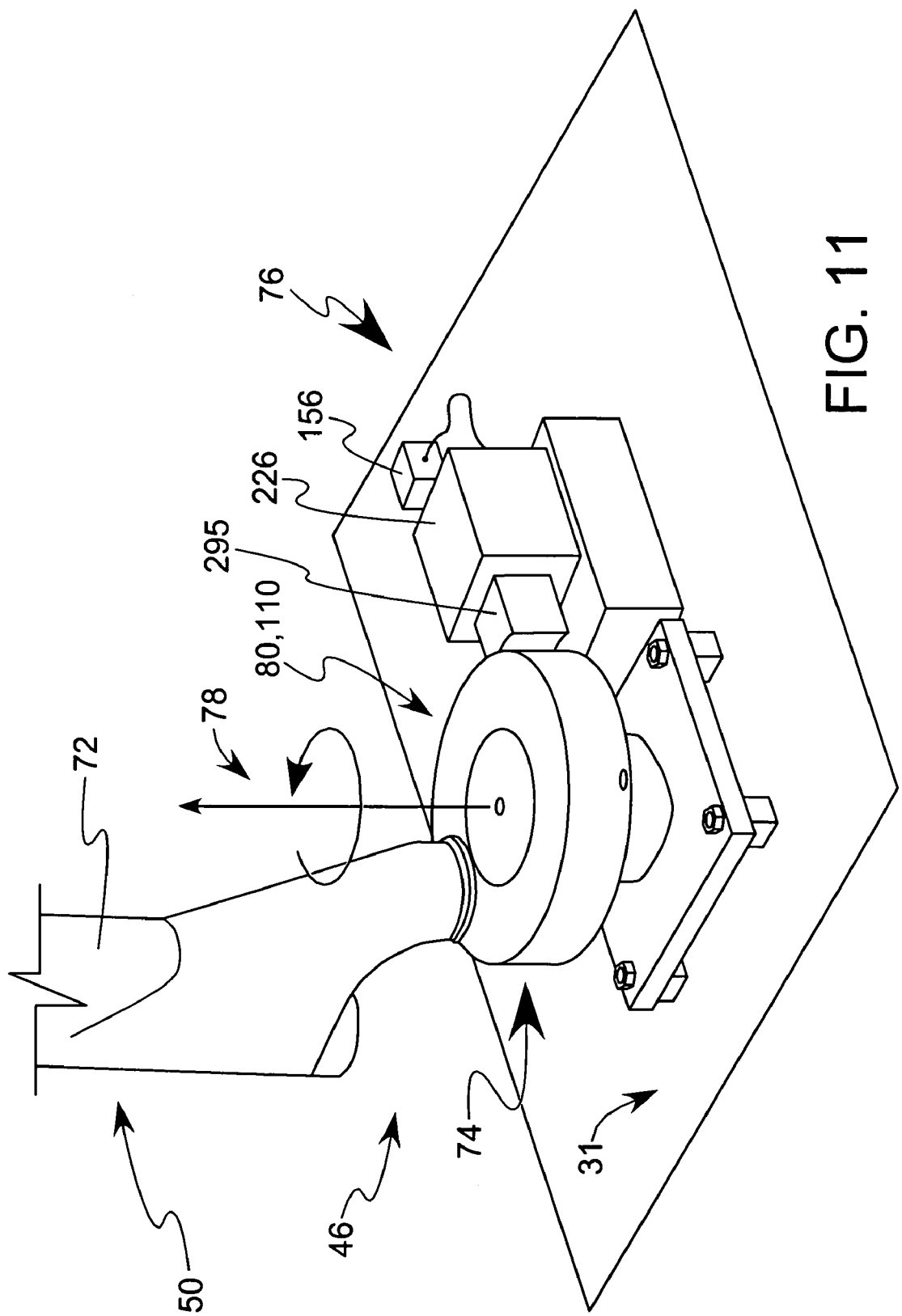
FIG. 11 is a perspective view of a seat release system that comprises a braking device and that allows complete 360 degree rotation of the operator's seat.

The operator's seat 32 need not be capable of rotating in a complete 360 degree range of motion, although a complete 360 degrees of rotation is within the scope of the present invention (see FIG. 11). Rather, it may be sufficient for the seat to be able to rotate at least through a predefined number of degrees of rotation as defined by the specific requirements of the vehicle. For example, the seat base assembly 202 may be configured to allow the operator's seat 32 to rotate between a range of approximately −20 degrees to +90 degrees with respect to a predetermined position. As such, the lock disk 212 (best seen in FIG. 8) comprises an arc of at least 110 degrees about the rotate assembly 206. Stops 218 project up from the mounting plate 208 positioned to cooperate with the lock disk 212. The stops 218 serve to limit the rotation of the lock disk 212. Each stop 218 preferably includes a bumper 220, e.g., an elastomeric material such as rubber, that serves to absorb shock and reduce metal to metal noise as the operator's seat 32 is rotated to its limits. The lock disk 212 may further include stop notches 222 in each terminal end portion 224 for receiving the corresponding stop 218/bumper 220 as the lock disk 212 is rotated to the corresponding limit of travel.

Referring to FIGS. 6 and 7, to provide the locking function, a lock assembly 226 is operatively configured to selectively engage the lock disk 212. As shown, the lock assembly 226 includes a lock device 228 configured to selectively advance a plunger 230 that engages the lock disk 212. When the plunger 230 is brought into engagement with a select one of the detents 216 along the periphery 214 of the lock disk 212, the plunger 230 in cooperation with the lock disk 212 provides a locking feature by preventing the rotate assembly 206, and thus the operator's seat 32, from freely rotating about the bearing shaft 204. Thus, the lock assembly 226 is one illustrative example of the release 108 discussed with reference to FIGS. 3 and 4.

As best seen in FIG. 8, a first detent 216A of the detents 216 comprises a first position provided along the periphery 214 of the lock disk 212, and is designated 0 degrees. The first detent 216A defines a generally forward facing position for an operator sitting in the operator's seat 32, i.e., facing the forks 36. A second detent 216B of the detents 216 comprises a second position provided along the periphery 214 of the lock disk 212 in a first direction from the first detent 216A. As shown in FIG. 8, the second detent 216B of the detents 216 is spaced approximately 20 degrees from the first detent 216A (to the left) and is thus designated as a −20 degree position.

A third detent 216C of the detents 216 comprises a third position provided along the periphery 214 of the lock disk 212 in a second direction from the first detent 216A that is opposite from the first direction from the first detent 216A. The third detent 216C is spaced approximately +60 degrees from the first detent 216A (to the right as shown) and is thus designated as a +60 degree position. Similarly, a fourth detent 216D of the detents 216 comprises a fourth position provided along the periphery 214 of the lock disk 212 in the second direction from the first detent 216A. As shown in FIG. 8, the fourth detent 216D is spaced approximately +90 degrees from the first detent 216A (to the right) and is thus designated as a +90 degree position.

Although FIGS. 6–8 show the use of four detents 216, in practice, any size and number of detents 216 may be arbitrarily provided. The size of the detents will depend on the structural requirements of the specific application. Moreover, the lock disk 212 can be adapted to allow 360 degrees of rotation and/or continuous repositioning of the operator's seat 32.

Referring back to FIGS. 6–8 generally, to support the lock assembly 226, a first lock support plate 232 extends from the mounting plate 208. The first lock support plate 232 may define an extension that is part of the same casting as the mounting plate 208. However, the first lock support plate 232 may alternatively be secured, e.g., welded, bonded, bolted or otherwise fastened to the mounting plate 208. Still alternatively, the first lock support plate 232 may be positioned proximate to but separate from the mounting plate 208. A second lock support plate 234 is positioned over, and coupled to the first lock support plate 232 using an appropriate coupling arrangement. For example, as shown in FIGS. 6 and 7, the first and second lock support plates 232, 234 each comprise four flange portions 236, one of the flange portions 236 generally being located at each of the four corner areas of the first and second lock support plates 232, 234.

A bolt assembly 238 is provided to couple the second lock support plate 234 to the first lock support plate 232 at each of the flange portions 236. Each bolt assembly 238 includes a bolt 240, a first washer 242, a first resilient mount 244, and a second resilient mount 246. The bolt 240 passes through the first washer 242, the first resilient mount 244, an aperture in the corresponding flange portion 236 of the second lock mounting plate 234, the second resilient mount 246 and fastens into a female threaded aperture in a flange portion 236 of the first lock support plate 232. Alternatively, a nut or other suitable terminating device may be used in conjunction with the bolt. Still further, alternative arrangements of resilient mounts and alternative fasteners may be used.

The resilient mounts 244, 246 comprise an elastomeric material such as rubber or other flexible or deformable material(s). The resilient mounts 244, 246 reduce noise when locking and unlocking the seat by providing shock absorption when the lock device 228 operates to engage and retract the plunger 230 from the lock disk 212. Moreover, the resilient mounts 244, 246 provide the ability to adjust the position of the lock device 228, e.g., to account for tolerances in aligning the lock device 228 with the lock disk 212. Still further, the resilient mounts 244, 246 provide play in the lock assembly 226 that reduces the effects of binding of the plunger 230 in engagement with a corresponding one of the detents 216 of the lock disk 212 when the lock device 228 releases the operator's seat 32 for adjustment.

As shown in FIGS. 6 and 7, the lock device 228 comprises an electro-mechanical device, e.g., a solenoid. A first support 250 is provided for securing the stator assembly 252 of the solenoid to the second drive mounting plate 234. For example, as shown, the first support 250 is integrally formed with the second lock support plate 234 and comprises first and second projections 254, 256 for securing the solenoid, such as by using bolts, etc. A shaft 264 of the solenoid thus defines at least a component of the plunger 230. As best seen in FIG. 6, a biasing arrangement 260, e.g., a spring, is provided to urge the plunger 230 to an extended (locked) position such that the default state of the lock assembly 226 is to lock the operator's seat 32 irrespective of whether there is power to the solenoid. Accordingly, as will be described in greater detail below, power is applied to the solenoid to retract the plunger 230 to release the operator's seat 32 for adjustment. The solenoid is thus de-energized when the operator's seat 32 is in a locked position. As shown in FIG. 7, in practice, the solenoid shaft and bias arrangement 260 may be protected by a dust cover 262 to prevent contaminants from interfering with the operation of the solenoid.

As best seen in FIG. 7, the plunger 230 comprises an assembly that includes the solenoid shaft 264 and a shaft extension 266. One exemplary way to couple the shaft 264 to the shaft extension 266 is to terminate the shaft 264 in a two ear clevis 268 and terminate the shaft extension in a single ear clevis 270. The single ear clevis 270 is inserted between the ears of the two ear clevis 268 and a dowel 273 or other suitable locking device is passed through the ears of the clevis 268, 270. The dowel 273 may be secured in position using a retainer 275, e.g., a cotter pin. Of course, other techniques such as the use of a collar, clamp, fitting, or other fastening or bonding arrangements may alternatively be used to couple the shaft 264 to the shaft extension 266. Still further, depending upon the application and component selection, a shaft extension may not be required. Referring to FIGS. 6 and 7 generally, the shaft extension 266 passes through a first bearing 272, extends radially towards the lock disk 212 and passes through a second bearing 274 that is positioned proximate to the rotate assembly 206.

As noted above, when the solenoid is not energized, the plunger 230 is biased toward the lock disk 212 via the spring 260. Accordingly, whenever the end of the plunger 230 is positioned opposite one of the detents 216, i.e., when the plunger 230 is substantially in line with a select detent 216, the plunger 230 is forced into the detent to lock the operator's seat 32 into the corresponding locked position. When the solenoid is energized, it operates to retract the plunger 230 so that the plunger 230 is not forced into one of the detents 216 on the lock disk 212. It was further noted above that it is possible for binding to occur when releasing the operator's seat 32. Binding may occur, especially when the operator's seat 32 is torqued, turned or otherwise twisted when the operator actuates the seat release element 104. As such, the resilient mounts 244, 246 allow "play" in the positioning of the solenoid such that the force required to withdraw the solenoid is reduced. Further, the above-described swivel of the operator support 48 with respect to the base structure 46 further reduces binding of the lock pin. However, it may be desirable to configure a relatively strong force to withdraw the plunger 230 from the detents 216. A lesser amount of force may then be utilized to maintain the plunger 230 withdrawn from the lock disk 212 while the operator's seat 32 is being repositioned.

As shown, the solenoid is controlled via a pulse width modulation (PWM) controller 278. The PWM controller 278 may be integral with the second module 156 or provided as a separate device which is controlled, at least in part, by the second module 156. The PWM controller 278 is operated such that a first PWM signal, e.g., one with a relatively higher duty cycle is used to withdraw the plunger 230 from the lock disk 212 when a seat release command is initiated, and a second PWM signal, e.g., one with a relatively smaller duty cycle is used to maintain the plunger 230 withdrawn from the lock disk 212 while the operator's seat 32 is being repositioned. By reducing the duty cycle of the PWM signal once the plunger 230 has been withdrawn from the lock disk 212, less power is consumed in the time period while the vehicle operator is repositioning the seat from a first locked position to a second locked position, which results in reduced heat build up and consequently, longer solenoid life.

A first detector 280 is operatively configured so as to detect when the lock device 228 is operated and the plunger 230 is extended to define a locked seat position. As an example, the first detector 280 may comprise a switch that is mounted so as to detect travel on either the shaft 264 or the shaft extension 266. As shown, the first detector 280 comprises a first contact switch that is mounted on top of the support structure for the first bearing 272. The first contact switch makes or breaks an electrical connection under the control of a first detecting surface 282, e.g., a vertically extending plate coupled to the shaft extension 266. The state of the first contact switch depends upon whether the seat is in a locked position or not. When the plunger 230 is locked into a select one of the detents 216 of the lock disk 212, the first detecting surface 282 is sufficiently close to the first contact switch to operate it. However, as the plunger 230 is retracted from a corresponding detent 216, the first detecting surface 282 moves back with the shaft extension 266 and is pulled sufficiently away from the first contact switch to release it. The first detector 280 is not limited to the contact switching arrangement shown. For example, other sensing arrangements can be utilized to determine whether the plunger 230 is positioned within any one of the detents 216 of the lock disk 212.

In the illustrative embodiment of FIGS. 6–8, the operator's seat 32 is capable of rotating approximately 110 degrees, from a zero degree position defining a forward facing position, to 20 degrees in a first direction and 90 degrees in a second direction with respect to the zero degree designated position. Assuming that there are four detents 216 in the lock disk, e.g., –20, 0, +60 and +90 as described above, the first detector 280 will determine if the seat is locked in any one of the –20, 0, +60 and +90 positions.

However, it may further be desirable to determine whether the operator's seat 32 is within a predetermined, limited range of its total allowed rotation, e.g., whether the operator's seat 32 is generally forward facing, irrespective of whether the seat is locked into a given detent 216. If such a design consideration occurs, a second detector 284 may be operatively arranged so as to detect the presence of the operator's seat 32 in the designated limited range.

As shown, the second detector 284 comprises a first rotating member 286 that is rotatably mounted to the top surface of the support structure of the second bearing 274. A second contact switch 288 is coupled to the first rotating member 286. The first rotating member 286 may be beneficial where adjustments to the position of the second contact switch 288 are required, such as to account for manufacturing tolerances, etc.

The second contact switch 288 is configured to detect the presence of a cam 290 (seen in FIG. 6) that projects from the rotate assembly 206, just above the lock disk 212 as shown. The cam 290 is oriented with respect to the lock disk 212 so as to define the desired range of positions to be detected. For example, assume that the cam 290 is configured to detect whether the operator's seat 32 is forward facing, thus the cam 290 is positioned in the vicinity of the designated 0 degree detent 216. When the operator's seat 32 is rotated into a forward facing position defined within the range of the cam 290, the cam 290 will operate the second contact switch 288 indicating that the general forward facing position is achieved. If the cam 290 is rotated past the second contact switch 288, then the second contact switch 288 is released indicating that the seat is "someplace else", i.e., not in the range of designated forward facing positions. As seen in FIG. 7 for example, the seat is rotated past the forward facing position as evidenced by the observation that the cam 290 is not in position to operate the second contact switch 288.

Referring briefly to FIG. 11, the drive assembly 226 may comprise other devices alternatively to a solenoid. For example, the drive assembly may comprise a brake system as schematically represented. The drive assembly 226 comprises a brake system that includes a braking device 295. The braking device engages the base member 110 to selectively lock and unlock the operator's seat from rotational positioning. Although schematically illustrated for purpose of simplifying the discussion herein, it is contemplated that any braking arrangement may be used. For example, the braking device may comprise calipers, pads or other arrangements. Moreover, the braking device 295 may engage other/additional surface(s) of the base member 110 other than as shown. Further, as shown, the base member 110 includes a disk that allows a complete 360 degrees rotation of the operator's seat if the specific application dictates a desire for a complete range of rotation. While not shown for sake of simplifying the discussion herein, the brake arrangement of FIG. 11 can include one or more sensors as discussed above with reference to FIGS. 6–8. Still further, other alternatives may be used to implement the drive assembly 226, including for example, mechanical, electrical, electro-mechanical, pneumatic, hydraulic and other powered sources. The specific drive assembly 226 will likely be determined by the capabilities and features of the specific vehicle.

Figure 9:
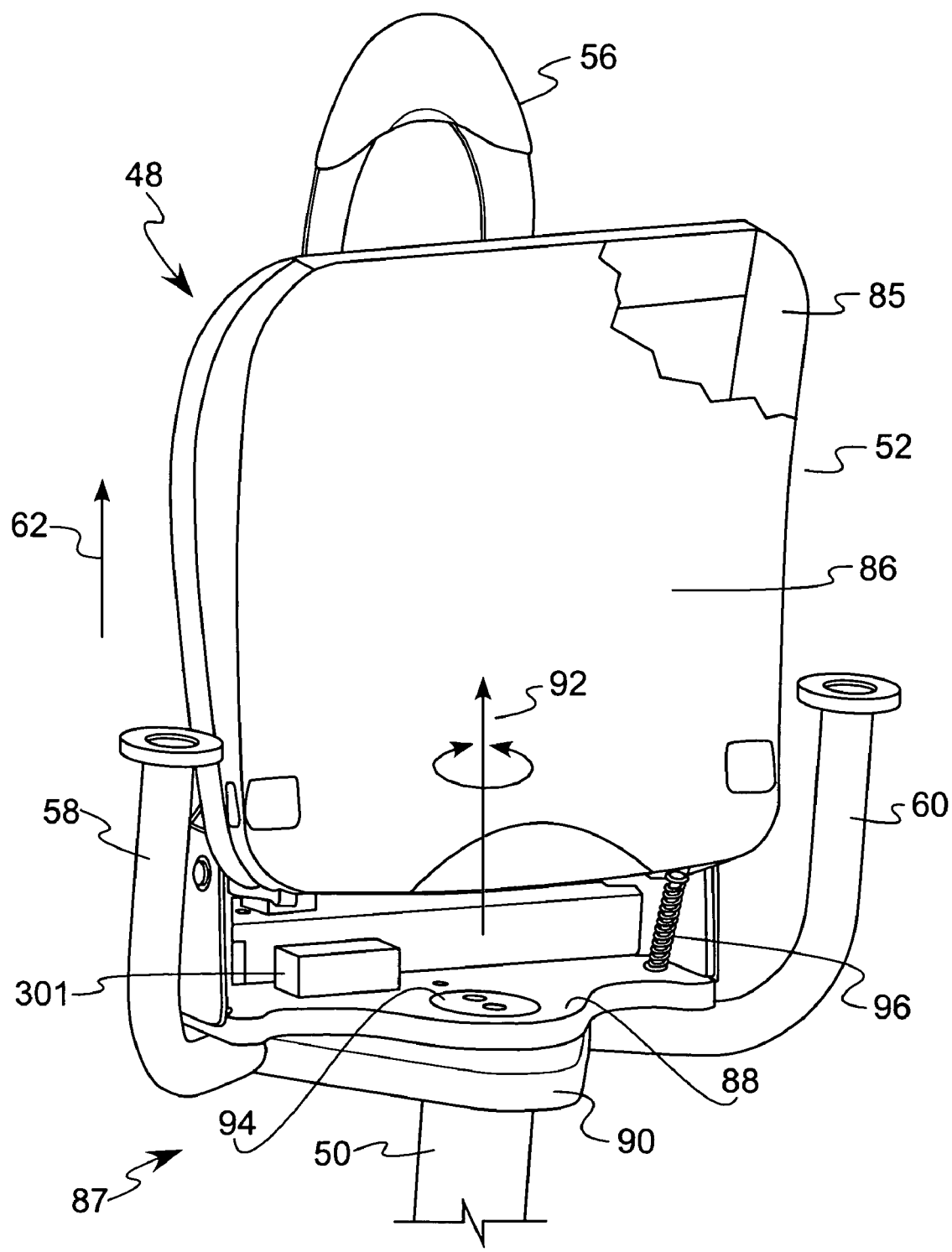
FIG. 9 is a perspective view of the operator's seat of FIG. 2 where the seat bottom is folded up against the seat back of the operator's seat.

Referring back briefly to FIG. 2, as noted above, the operator's seat 32 is provided with a sensor to determine whether an operator is seated. One exemplary way to detect the presence of an operator in the operator's seat 32 is illustrated with respect to FIGS. 9 and 10 in combination with FIG. 2. FIG. 9 illustrates the operator's seat 32 with the armrests 58, 60 and the lower half of the intermediate member 50 removed for clarity. As noted with reference to FIG. 2, the seat base 52 can be rotated to a "seat up" position according to the direction arrow 62 as shown in FIG. 9, or rotated to a "seat down" position as shown in FIG. 2. Along the back end of the periphery of the seat base 52, a seat bottom frame member 302 is provided that cooperates with a third sensor 314 to detect the presence of an operator.

Figure 10:
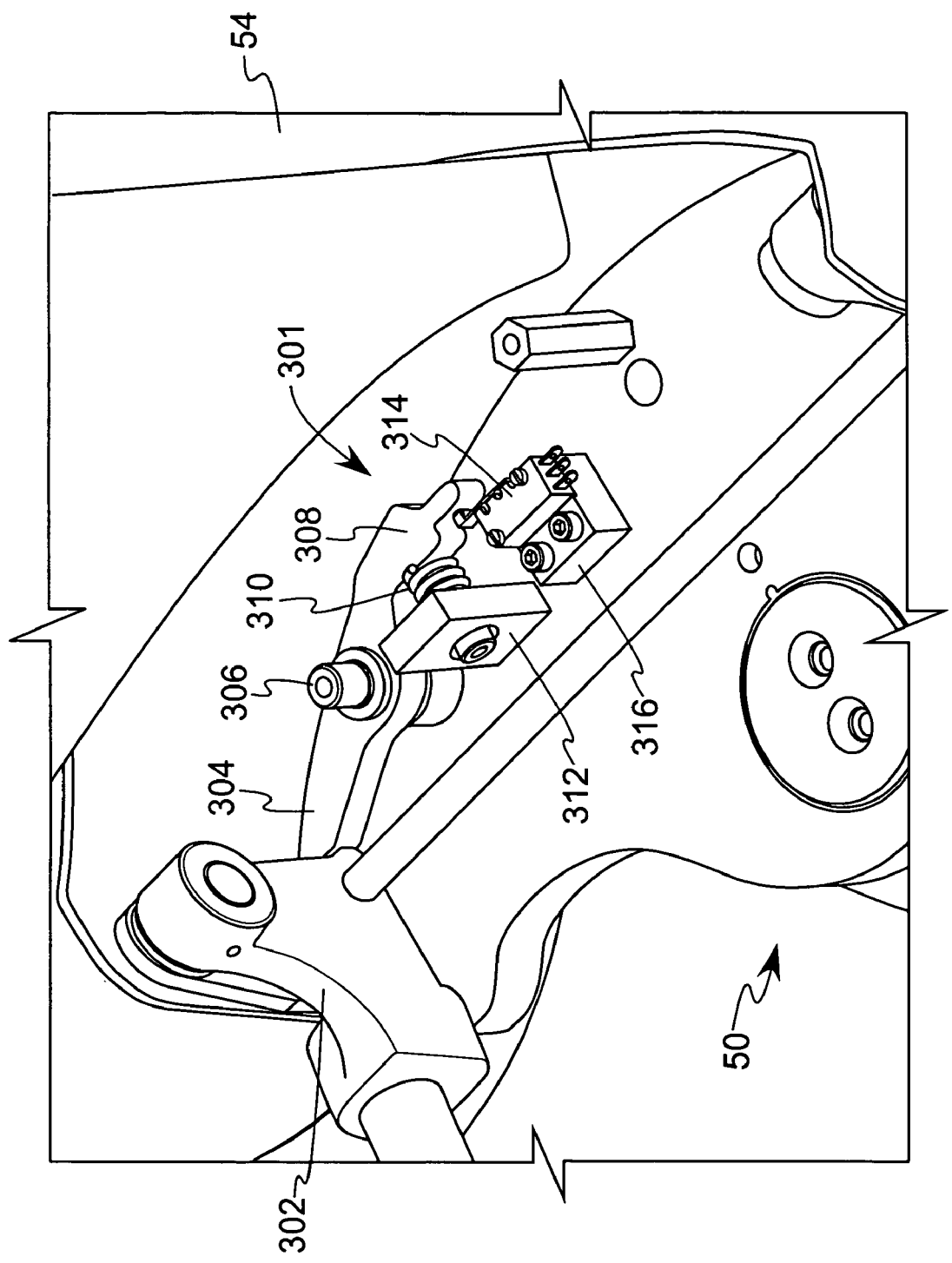
FIG. 10 is a perspective view of a sensor in the operator's seat of FIGS. 2 and 9 for determining whether a an operator is seated in the operator's seat.

Referring to FIG. 10, the seat bottom frame member 302 pivots with the seat base 52 such that when the seat base 52 is in the down position and an operator is seated, the seat bottom frame member 302 engages a lever 304. The lever 304 is rotatable about a pivot pin 306 in response to engagement by the seat bottom frame member 302. The lever 304 comprises a head portion 308 which is biased by a biasing member, e.g., by a spring 310 and spring support structure 312. The head portion 308 is further positioned proximate to a third detector, e.g., a third contact switch 314. The third contact switch 314 may optionally be positioned on a block 316 or other, optionally adjustable support structure.

When the seat base 52 is in a down position and an operator is seated, the seat bottom frame member 302 of the seat base pushes against the lever 304 causing the lever 304 to rotate about the pivot pin 306 in a clockwise manner as shown. The clockwise rotation of the lever 304 causes the biasing member to compress, which allows the head 308 of the lever 304 to operate the contact switch 314 indicating that an operator is seated. If there is no operator in the seat, for example, when the operator's seat 32 is in the up position shown in FIG. 9 or in the down position of FIG. 2, the biasing member rotates the lever 304 counterclockwise so that the head portion 308 of the lever 304 allows the contact switch 314 to release thus designating that the operator is not seated. The status of the contact switch 314 may be communicated to a module, e.g., the module 152 shown in FIG. 2, and be broadcast to the second module 156, e.g., the VCM module, or alternatively, the third switch 314 may be hardwired directly to the VCM, i.e., the second module 156, or to any other module 152, 158, 160, 162, etc.

Having described the invention in detail and by reference to preferred embodiments thereof, it will be apparent that modifications and variations are possible without departing from the scope of the invention defined in the appended claims.

What is claimed is:

1. A system for repositioning an operator's seat in a vehicle comprising:
   a repositionable operator's seat;
   a seat release control for unlocking said operator's seat from a locked position;
   a first module coupled to said seat release control that transmits a first message over a network designating an operation of said seat release control;
   a second module that receives said first message transmitted over said network; and
   a seat release system that is coupled to said second module, said seat release system controlled to unlock said operator's seat from a designated locked position for repositioning of said seat based at least upon said first message transmitted over said network.

2. The system according to claim 1, wherein said seat release control is positioned on an armrest of said operator's seat and said first module is positioned in proximity to said armrest.

3. The system according to claim 2, wherein said seat release control comprises a push button control.

4. The system according to claim 1, where said network comprises a controller area network.

5. The system according to claim 1, wherein said seat release system further comprises a detector for determining whether said operator's seat is in a locked position or whether said seat is unlocked for repositioning.

6. The system according to claim 5, wherein at least one function of said vehicle is disabled or modified while said operator's seat is unlocked for repositioning.

7. The system according to claim 1, wherein said seat release system further comprises a detector that is operatively configured to sense a limited range of rotated positions of said operator's seat.

8. The system according to claim 7, wherein at least one function of said vehicle is disabled or modified while said detector indicates that said operator's seat is outside of said limited range of positions.

9. The system according to claim 1, wherein said seat release system further comprises a sensor operatively configured to detect whether an operator is seated in said operator's seat, wherein at least one function of said vehicle is disabled or modified while said sensor detects that said operator is not in said operator's seat.

10. The system according to claim 1, further comprising at least one additional module communicably coupled to said network, wherein said second module determines whether to unlock said operator's seat further based at least in part upon information received by said second module from said additional module.

11. The system according to claim 10, wherein said additional module detects a speed of said vehicle, and said second module keeps the operator's seat locked as long as said vehicle is traveling above a predetermined threshold speed.

12. The system according to claim 1, further comprising at least one additional module communicably coupled to said network, wherein said second module determines whether at least one vehicle feature should be disabled or modified when said operator's seat is unlocked based upon an input from said additional module.

13. A system for repositioning an operator's seat in a vehicle comprising:
   a repositionable operator's seat having:
      a base structure;
      an operator support coupled to said base structure, said operator support including a seat bottom upon which a vehicle operator may sit;
      an armrest extending from said base structure; and
      a rotation assembly arranged such that said base structure of said operator's seat is manually rotatable about a first axis by said vehicle operator;
   a release assembly for transitioning between a first state wherein said rotation assembly is locked with respect to said release assembly and a second state wherein said rotation assembly is released for manual repositioning by said operator;
   a seat release control on said armrest for operating said release assembly between said first and second states for rotatably repositioning said operator's seat; and
   a first module electronically coupled between said seat release control and said release assembly for electronically transmitting a first message to said release assembly designating an operation of said seat release control.

14. The system according to claim 13, wherein:
   said rotate assembly comprises a lock disk having a plurality of locking positions thereon, and said release assembly locks said operator's seat from rotation when said operator's seat is rotated so as to bring a select one of said locking positions substantially in line with said release assembly and said seat release control is not activated.

15. The system according to claim 14, wherein said rotate assembly further comprises at least one stop that limits the range of rotation of said operator's seat when said operator's seat is released for repositioning.

16. The system according to claim 13, wherein said release assembly comprises a solenoid that locks said operator's seat from rotating by engaging said rotate assembly when said operator's seat is released for repositioning.

17. The system according to claim 16, wherein said rotate assembly comprises a lock disk having a plurality of locking positions thereon, and said solenoid is operatively configured to lock said operator's seat by engaging a select one of said locking positions on said lock disk.

18. The system according to claim 16, wherein said solenoid is controlled by a first duty cycle pulse width modulation signal when retracting a plunger from said rotate assembly and said solenoid is controlled to retain said plunger in a retracted position while said operator's seat is being repositioned by a second duty cycle pulse width modulation signal.

19. The system according to claim 16, wherein said solenoid comprises a plunger having a solenoid shaft coupled to a shaft extension, said shaft extension guided by bearings towards said rotate assembly.

20. The system according to claim 16, wherein said release assembly further comprises a support plate that is coupled to said rotate assembly by resilient mounts configured to allow play between a plunger of said solenoid and said rotate assembly.

21. The system according to claim 13, wherein:
said seat release control is provided above a horizontal plane of an armrest of said operator support; and
said operator support further comprises a first vehicle control for operating a task of said vehicle, wherein said seat release control is operative simultaneously with said first vehicle control while operating said vehicle.

22. The system according to claim 13, wherein said operator's seat may rotate 360 degrees when said release assembly is released from engagement with said rotate assembly.

23. The system according to claim 13, further comprising a detector for detecting whether said operator's seat is locked or unlocked and at least one vehicle control module that selectively enables or disables a vehicle fixation based upon a state of said detector.

24. The system according to claim 13, further comprising at least one vehicle control module that selectively enables or disables said first message electronically communicated by said first module from operating said release assembly based upon a determined state of said vehicle.

25. The system according to claim 13, wherein said rotate assembly further comprises:
a cam for designating a limited range of positions of said operator's seat;
a detector for detecting a position of said cam; and
at least one vehicle control module that selectively enables or disables a vehicle function based upon a state of said detector.

26. The system according to claim 13, wherein said operator's seat further comprises:
a sensor for designating whether an operator is seated in said operator's seat; and
at least one vehicle control module that selectively enables or disables said first message electronically communicated by said first module from operating said release assembly based upon a determined state of said vehicle.

27. The system according to claim 13, wherein said release assembly comprises a braking device and said operator's seat can be selectively locked in any rotated position.

28. A system for repositioning an operator's seat in a vehicle comprising:
a repositionable operator's seat;
a control handle provided on an armrest of said operator's seat for performing at least one predetermined task;
a seat release control provided on said control handle for unlocking said operator's seat for repositioning;
a first module coupled to said seat release control that transmits a first message over a network designating an operation of said seat release control;
a second module that receives said first message transmitted over said network; and
a seat release system that is coupled to said second module, said seat release system for unlocking said operator's seat from a designated locked position for repositioning of said seat based at least upon said first message.

29. The system according to claim 28, wherein said control handle comprises a multifunction control handle and said seat release control is incorporated into said multifunction control handle such that said seat release control is operative simultaneously with an operative control of said multifunction control handle.

30. The system according to claim 28, wherein said seat release control is positioned above a substantially horizontal plane defined by the top of an armrest of said operator's seat.

31. The system according to claim 28, wherein said second module comprises a vehicle control module that controls a plurality of vehicle functions.

32. The system according to claim 28, wherein said operator's seat is repositionable by rotating said operator's seat about a first axis.

* * * * *

UNITED STATES PATENT AND TRADEMARK OFFICE
CERTIFICATE OF CORRECTION

| | |
|---|---|
| PATENT NO. | : 7,059,680 B2 |
| APPLICATION NO. | : 10/948495 |
| DATED | : June 13, 2006 |
| INVENTOR(S) | : Steven C. Billger et al. |

It is certified that error appears in the above-identified patent and that said Letters Patent is hereby corrected as shown below:

In the claims:

Col. 17, line 50, "vehicle fixation based upon" should read --vehicle function based upon--.

Signed and Sealed this

Third Day of October, 2006

JON W. DUDAS
*Director of the United States Patent and Trademark Office*